United States Patent [19]

Ban

[11] 4,049,531

[45] Sept. 20, 1977

[54] ELECTROLYTIC HYPOCHLORITE GENERATOR

[76] Inventor: Stephan C. Ban, 9009 Mears St., Fairfax, Va. 22030

[21] Appl. No.: 706,360

[22] Filed: July 19, 1976

[51] Int. Cl.² .......................... C25B 1/26; C25B 15/08
[52] U.S. Cl. .................................... 204/275; 204/149
[58] Field of Search ............... 204/149, 152, 275, 294, 204/279, 280

[56] References Cited

U.S. PATENT DOCUMENTS

| | | | |
|---|---|---|---|
| 673,452 | 5/1901 | Roberts | 204/275 X |
| 754,114 | 3/1904 | Atkins | 204/294 X |
| 1,191,356 | 7/1916 | Smith | 204/275 X |
| 3,046,216 | 7/1962 | Lowe | 204/294 |
| 3,224,906 | 12/1965 | Deibel et al. | 429/90 |
| 3,458,414 | 7/1969 | Crane et al. | 204/149 |
| 3,459,652 | 8/1969 | Grangaard | 204/294 |
| 3,547,800 | 12/1970 | Pan | 204/149 X |
| 3,622,479 | 11/1971 | Schneider | 204/149 |
| 3,743,592 | 7/1973 | Metcalfe | 204/266 |
| 3,745,106 | 7/1973 | Jacobs | 204/243 R |

*Primary Examiner*—Arthur C. Prescott
*Attorney, Agent, or Firm*—Nathan Edelberg

[57] ABSTRACT

An improved electrolytic hypochlorite generator for use in water treatment. A low pressure capillary flow enables the use of low cost corrosive resistant plastic components, while the need to extend the electrodes beyond the electrolyte level in the electrolytic cell to prevent corrosion of the electrical connections is eliminated by the use of water repellent impregnated electrical connectors. Furthermore, by eliminating this need to extend the electrodes beyond the electrolyte level in the electrolytic cell, a more compact unit can be constructed, and the deterioration that normally occurs at the point at which the electrodes would emerge from the electrolyte is prevented.

9 Claims, 3 Drawing Figures

ELECTROLYTIC HYPOCHLORITE GENERATOR

The invention described herein may be manufactured, used, and licensed by or for the Government for Government purposes without the payment to me of any royalties thereon.

The present invention relates to an electrolytic hypochlorite generator for chlorinating a body of water such as a swimming pool or for treating sewage.

There are basically two methods by which chlorination can be achieved. One method of chlorinating is to introduce gaseous chlorine directly into the water to be treated. However, chlorine gas, particularly in the quantities required for large facilities, is extremely dangerous. Thus, to date, the most common method of chlorination is by the use of hypochlorites or hypochlorite solutions. The latter solutions are conventionally produced by the electrolysis of a brine, and U.S. Pat. No. 2,873,236 is typical of such electrolytic devices.

Though electrolytic cells for producing hypochlorits from metallic chloride salts have been well known, their application to large systems has been limited by the large cost involved in manufacturing these devices which are constructed to operate under high pressures, and which deteriorate rapidly as a result of the extremely corrosive nature of the electrolyte and electrolytic process.

One particularly common problem is destruction of the electrical connections which supply power to the electrodes. This destruction is a result of the electrolyte and corrosive gases in the cell coming into contact with the metal contacts and leads of the power connection, and this contact frequently is the result of these corrosive agents passing through the porous graphite conventionally used for the electrodes. As a result, under normal operating conditions, the electrical connectors would last only two weeks to a month, and then the system had to be shut down and the connections replaced. In addition, on some occasions, gas generated from the reaction of the metal connector parts decomposing would cause bursting of the electrodes. Numerous attempts have been made to overcome this problem; however, they have been unsatisfactory for various reasons. The two most common efforts to minimize corrosion of the connectors are normally used together and involve the use of sacrificial anodes and extension of the electrodes above the level of electrolyte. However, sacrificial anodes do not correct the problem, they only slow the rate of corrosion, and extending the electrodes above the electrolyte increases the size and cost of the electrolytic cell and results in burn ring formation in the electrodes at the point that they emerge from the electrolyte, thereby shortening their life.

Accordingly, it is an object of this invention to produce an electrolytic hypochlorite generator that is not subject to the above noted drawbacks.

Another object of this invention is to provide an electrolytic hypochlorite generator that utilizes a low pressure capillary feed system, thereby permitting the use of low cost corrosive resistant plastics.

A further object is to provide an electrolytic generator cell that utilizes a water repellant impregnated graphite or carbon electrical connector.

A still further object is to utilize an electrolytic cell that has its electrodes completely submerged in the electrolyte.

Other objects, characteristics and advantages of the present invention will be apparent from the following detailed description taken in connection with the accompanying drawings in which.

Figure 1:
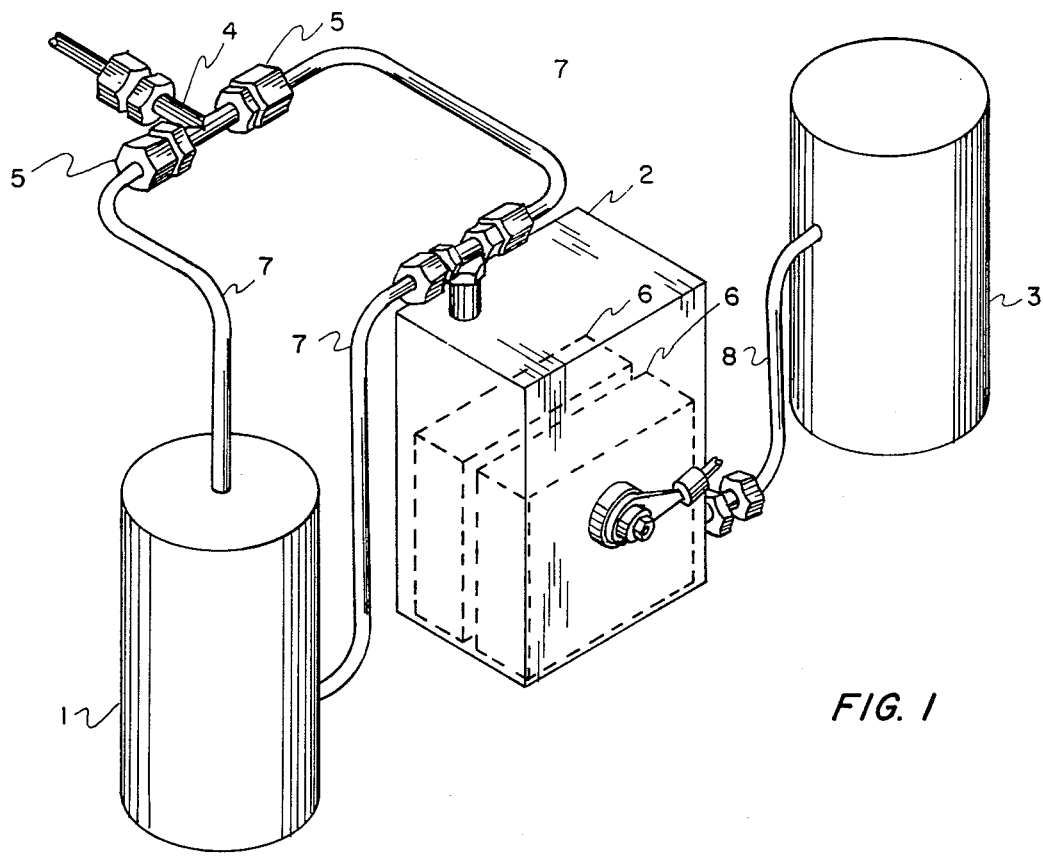
FIG. 1 is and illustration of the hyperchlorite generation system of the present invention.

Referring now to the drawings, FIG. 1 schematically illustrates an apparatus for producing sodium hypochlorite that comprises a first container 1 to which a metallic chloride salt, such as common rock salt, and water are added to form the electrolytic brine, an electrolytic cell 2 in which the sodium hypochlorite is formed, and a receiver 3 in which the hypochlorite is stored and from which it is supplied to the water to be treated. Water is supplied to both the container 1 and cell 2 via line 4 that includes capillary flow regulators 5 which are used to maintain a stable low pressure, low volume, trickling flow. Electrolytic cell 3 utilizes conventional carbon electrodes 6; for example, electrodes manufactured by Union Carbide under the designation AGLR-52 are suitable. Flow conduit 7 supplies saturated brine to the cell 3, while conduit 8 withdraws a concentrated sodium hypochlorite solution from a point near the bottom of the cell. Because of the low pressure flows utilized in the system of present invention, the case of the electrolytic cell 2 can be formed of low cost plastics which are resistant to the brine, chlorine and other corrosive agents formed in the electrolyte. Two suitable materials are polyvinyl chloride and polyethylene.

Figure 2:
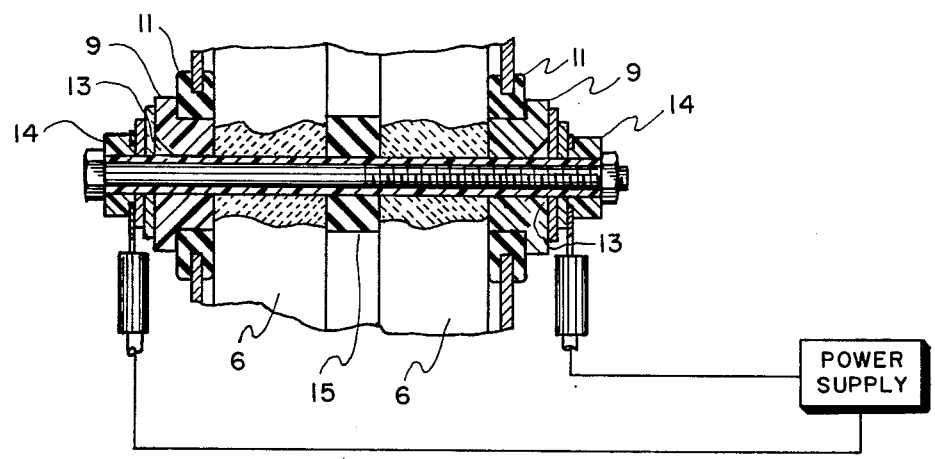
FIG. 2 is a partial sectional view of the electrolytic cell of the present invention illustrating a preferred embodiment electrical connector.

Electricity is supplied to the electrodes by electrical connectors 9 of a novel construction that eliminates the problem of the leads and terminals corroding, and enables them to be connected to the electrodes below the level of the electrolyte. The electrical connectors 9 are formed of carbon or graphite that has been vacuum impregnated with a water repellant material such as wax. As best illustrated in FIG. 2, the connectors are cylindrical in shape with a radial flange at one end an axial passage through the center, though other shapes can be advantageously used. The connectors are attached to the side of one or both electrodes by passing them through apertures in the electrolytic cell's case 10. The apertures are provided with a rubber feed-through ring 11 that acts to provide a tight seal between the connector and case, and a bolt inserted through the axial passage and electrically insulated by a sleeve or bushing 12 holds the connectors to the electrodes. An O-ring 13 can be mounted in a recess in the outer end of connector 9 to insure a leak proof seal between the connector 9 and bushing 12. The bolt is also insulated from the leads by plastic washers 14 which project into the lead aperture.

Figure 3:
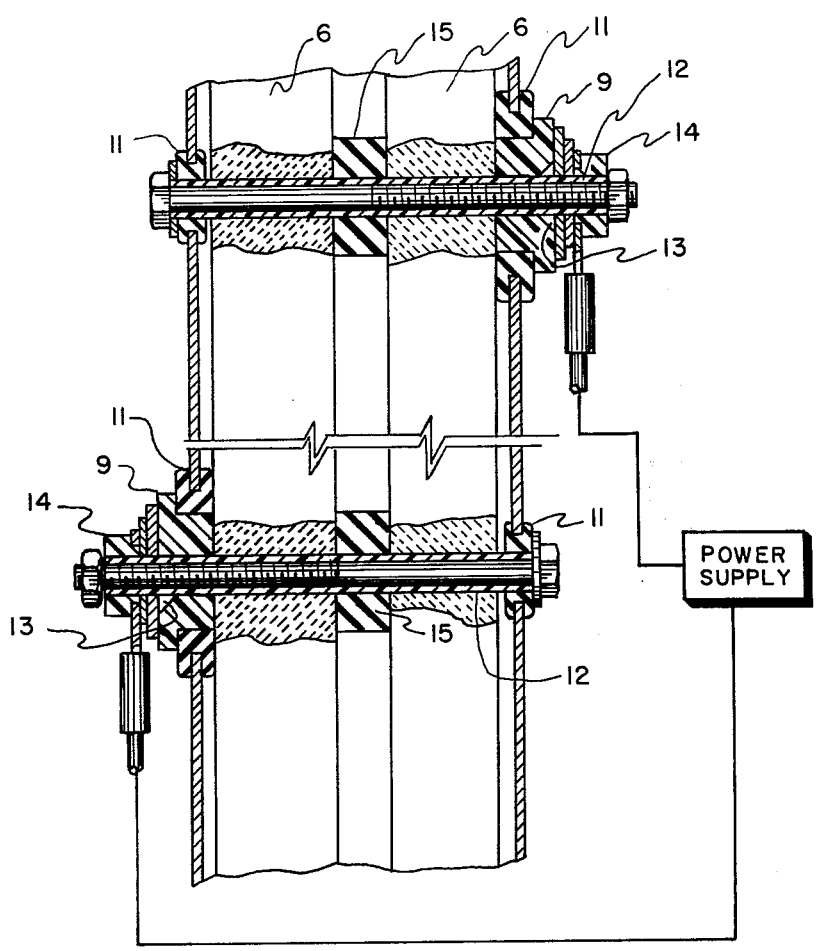
FIG. 3 is a sectional view of a second electrolytic cell configuration.

FIGS. 2 and 3 illustrate two alternate manners in which the electrical connectors can be mounted to the electrodes. In FIG. 2, a single connector bolt connects the electrodes and connectors together with a spacer 15 placed over the bolt between the electrodes. In FIG. 3, separate connector bolts are used for attaching each electrical connector 9 to a respective electrode and is desirable for use in large electrolytic cells. Other configurations are possible and the concept can be applied to any shape electrode, the important factors being only that the impregnated electrical connectors be used and mounted so that the entire electrode can be submerged in the electrolyte.

In operation, a trickling water flow is supplied by line 4 to container 1 which is filled with the metallic chloride salt. The water acts to dissolve the salt as it passes through the salt crystals so that by the time it reaches the bottom of the container 1 a saturated salt solution is formed. The saturated solution is then mixed with an appropriate flow of fresh water supplied from the other branch of the capillary feed line 4 so as to reduce brine consumption to an optimum level. This mixture is then dripped into the electrolytic cell 2 wherein the electrolytic process produces, in the case of rock salt, sodium hypochlorite. Since the sodium hypochlorite is heavier than the electrolyte, it settles to the bottom of the electrolytic cell 2 and is removed in a concentrated liquid form by conduit 8 which delivers it to the receiver 3.

It should be noted that, while the supply lines have been represented as single pipes and only a single electrolytic cell has been shown, the invention contemplates the use of a plurality of electrolytic cell modules for large treatment systems wherein lines 4, 7, and 8 would be capillary flow controlled manifolds connected in parallel to the cells.

It should be noted also that while capillary flow control is preferred due to its low cost and stable flow, other flow control means can be utilized.

Furthermore, it is clear that other and further modifications may be apart from those suggested herein without departing from the spirit and scope of this invention which is defined by the appended claims.

I claim:

1. An electrolytic hypochlorite generating system comprising:
   a container of metallic chloride salt, an electrolytic cell containing a pair of electrodes,
   means to provide a stable trickling flow of water to an upper portion of said container,
   means to withdraw a saturated salt solution from lower end of said container,
   means to mix a second trickling flow of water with said solution and drip the mixture into said electrolytic cell,
   means to supply electrical power to said eletrodes including electrical connectors distinct from said electrodes and formed of carbon impregnated with a water repellant material, and
   means to withdraw a hypochlorite solution from a lower portion of said electrolytic cell.

2. The hypochlorite generating system of claim 1 wherein
   said container is formed of plastic and said electrolytic cell has a case formed of plastic.

3. The hypochlorite generating system of claim 2, wherein
   said plastic is polyvinyl chloride.

4. The hypochlorite generating system of claim 1, wherein
   said means to provide a stable trickling flow includes capillary flow regulating means.

5. The hypochlorite generating system of claim 1, wherein
   said water repellant material is wax.

6. The hypochlorite generating system of claim 1, wherein
   said electrical connectors are attached to a side of said electrodes, and wherein said electrodes are mounted within said cell entirely below the level of electrolyte in the cell.

7. The hypochlorite generating system of claim 6, wherein
   said electrolytic cell has a case with a pair of apertures, an electrical connector extending through each aperture into contact with a respective one of said electrodes, and seal means between said connectors and the wall of the apertures.

8. The hypochlorite generating system of claim 4, wherein
   said electrolytic cell has a case with a pair of apertures, and electrical connector extending through each aperture into contact with a respective one of said electrodes, and seal means between said connectors and the wall of the apertures.

9. The hypochlorite generating system of claim 5, wherein
   said electrolytic cell has a case with a pair of apertures, an electrical connector extending through each aperture into contact with a respective one of said electrodes, and seal means between said connectors and the wall of the apertures.

* * * * *